United States Patent
Kohlstrung et al.

(10) Patent No.: US 8,436,105 B2
(45) Date of Patent: May 7, 2013

(54) VULCANIZABLE COMPOSITION HAVING ACOUSTIC ATTENUATING PROPERTIES

(75) Inventors: Rainer Kohlstrung, Plankstadt (DE); Takehito Yamada, Heidelberg (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/306,333

(22) Filed: Nov. 29, 2011

(65) Prior Publication Data
US 2012/0136129 A1 May 31, 2012

Related U.S. Application Data

(63) Continuation of application No. PCT/EP2010/057591, filed on Jun. 1, 2010.

(30) Foreign Application Priority Data

Jun. 8, 2009 (DE) .......................... 10 2009 026 824

(51) Int. Cl.
*C08L 9/06* (2006.01)
*C08L 53/02* (2006.01)
*C08J 3/24* (2006.01)

(52) U.S. Cl.
USPC .................. 525/332.6; 525/332.5; 525/332.9; 525/343; 525/348; 525/383; 525/387; 525/331.9; 252/182.13; 252/182.17; 252/182.23; 521/73; 521/75; 521/139; 521/140; 521/148; 524/571; 524/575; 524/577; 524/578; 524/580

(58) Field of Classification Search .............. 252/182.13, 252/182.17, 182.23; 521/73, 75, 139, 140, 521/148; 525/332.5, 332.6, 332.9, 343, 346, 525/347, 348, 349, 387, 383; 524/571, 575, 524/576, 577, 578, 580
See application file for complete search history.

(56) References Cited

U.S. PATENT DOCUMENTS

| | | | |
|---|---|---|---|
| 5,994,422 A | 11/1999 | Born et al. | |
| 6,004,425 A | 12/1999 | Born et al. | |
| 6,242,523 B1 * | 6/2001 | Blok et al. | .......... 524/495 |
| 6,361,643 B2 | 3/2002 | Born et al. | |
| 2007/0299193 A1 | 12/2007 | Sauer et al. | |
| 2009/0036595 A1 | 2/2009 | Kohlstrung et al. | |
| 2009/0062411 A1 | 3/2009 | Rappmann et al. | |

FOREIGN PATENT DOCUMENTS

| | | |
|---|---|---|
| CA | 2 205 953 A1 | 5/1996 |
| DE | 44 41 656 A1 | 5/1996 |
| EP | 1 035 164 A1 | 9/2000 |
| JP | 2005-114141 * | 4/2005 |
| WO | WO 2009/036784 A1 | 3/2009 |

OTHER PUBLICATIONS

Machine translation of JP 2005-114141, Apr. 2005.*
Internaional Search Report dated Aug. 25, 2010, PCT/EP2010/057591.

* cited by examiner

*Primary Examiner* — Roberto Rabago
(74) *Attorney, Agent, or Firm* — Mary K. Cameron

(57) ABSTRACT

The invention relates to a composition that can be thermally cured, containing relative to the total composition, a) 5 to 90% by weight of a diene-based polymer or copolymer containing an olefinic double bond and/or an aromatically substituted olefin, wherein the polymer or copolymer is liquid, or paste-like, at 22° C. and has a glass transition temperature between −30° C. and +15° C., measured according to a DSC method; b) a vulcanization system selected from the group consisting of: b1) sulfur, and one or more accelerator(s), b2) peroxidic or disulfidic vulcanization systems, b3) quinones, quinone dioximes, or dinitrosobenzene.

20 Claims, 4 Drawing Sheets

VULCANIZABLE COMPOSITION HAVING ACOUSTIC ATTENUATING PROPERTIES

Figure 1:
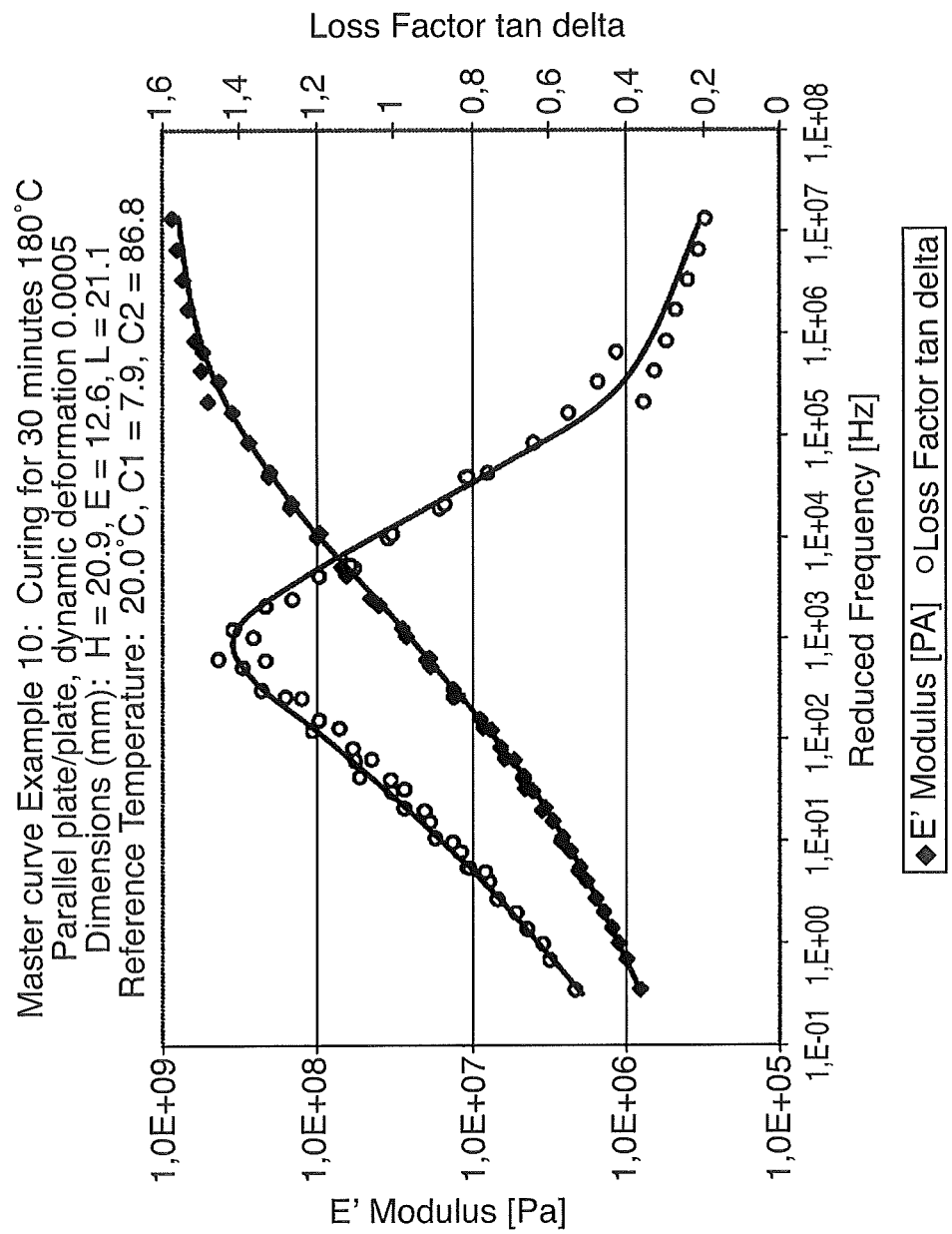

This application is a continuation under 35 U.S.C. Section 365(c) and 120 of International Application No. PCT/EP2010/057591, filed Jun. 1, 2010, and published on Dec. 16, 2010 as WO 2010/142563, which claims priority from German Patent Application No. 10 2009 026 824.3 filed Jun. 8, 2009, which are incorporated herein by reference in their entirety.

The present invention relates to a heat-curable composition that after curing, on the one hand possesses acoustic attenuating properties, and on the other hand can fulfill at least one additional (mechanical) function, for example as an underlay compound or as an adhesive or sealant. However, it can also be used solely as an acoustic attenuating coating. It has the advantage of being deliverable at room temperature or in the heated state by means of conventional pumps, thereby obviating the need for manufacturing prefabricated parts (e.g. by injection molding) or for special extrusion techniques. Principal applications are in vehicle construction and in the equipment construction sectors (in particular equipment with engines that develop noise)

In today's vehicle construction (passenger cars/HGV/buses/trains), attachments, paneling, but also for example the roof area and the vehicle floor, are equipped with acoustic attenuating compounds in order to reduce or to prevent the various vibrations of the structure and therefore the noise transmission in the application range from −40 to +90° C. These attenuating compounds are often based on bitumen in the form of mats that have to be tailored to each vehicle geometry. Injectable and extrudable attenuating compounds based on rubber, epoxy and aqueous (acrylate) dispersions are likewise known. All these attenuating compounds are applied on the surface mainly in the body shell or in the paint area onto the vehicle. In addition, particularly for attachments and paneling, but also in the roof area, so-called underlays are applied between the exterior skin and corresponding roof arches or security and strengthening elements in order to prevent any vibration of the external skin and any knocking together of the individual components of the vehicle, as well as to ensure the corresponding separation distances of the groups of components. In addition, the vehicle structure is strengthened by the solidity of the underlay. These underlays sometimes have sealing functions as well. The underlays can be employed as pumpable products but also as directly extrudable or extruded or injection molded articles in the manufacturing process of a vehicle and are mostly based on rubber. However, acrylate, epoxy or PVC are also known as the raw material base.

For the attenuation and the underlay there are therefore at least two different materials used in vehicle construction in the prior art and which are each employed in varying degrees as required in the various vehicle segments and depending on the manufacturer. This results in the following disadvantages for the customers:
- complex logistics for at least two different products,
- administrative costs and expense for managing different articles and products,
- different specific application equipment for the different products and consequently high investment costs,
- required space for different application units,
- elaborate vehicle designs in order to be able to apply different products onto the vehicle body.

Furthermore, applying at least two different products in order to achieve the required effects sometimes strongly increases the vehicle mass due to the materials such that the fuel consumption increases because of this weight. Thus, acoustically effective products are mostly applied on the surface onto the external skin or the underside of the vehicle, whereas underlays are applied onto appropriate roof arches or strengthening elements or simply between two metal sheets. This means that different target areas exist for both product groups.

All of these abovementioned products and functions are mainly applied directly by means of pumpable products by the original equipment manufacturer.

According to the state of the art, white goods such as washing machines, washer driers, dishwashers, etc. are acoustically insulated by means of insulating mats.

In order to solve this problem, it is inventively intended to combine the functions of acoustic insulation and the functions of underlays or adhesion or sealing in one product. Indeed it is already possible to manufacture such a product in an extrudable or injection moldable variant, but it appears that the possibility of manufacturing such a product as a pumpable product does not exist so far. As a result of the high degree of automation that exists with the vehicle manufacturers, the application is principally configured for pumpable products that are coated by robots; it is also desirable to manufacture a pumpable variant of a combination product of an underlay and acoustically effective insulation compound. Conventional underlay adhesives, as are employed at the present time in vehicle construction, have no or only very slight acoustic attenuation properties.

The German patent application DE 10 2005 00305 describes an injectable, low viscosity rubber acoustic insulation compound based on natural and/or synthetic olefinic double bond-containing elastomers and vulcanization agents, said compound comprising
  a) 5-50 wt % of liquid polyene(s) with a molecular weight of less than 20 000,
  b) a vulcanization system selected from the group consisting of sulfur and one or more organic accelerator(s) and metal oxide(s),
    peroxidic vulcanization systems or
    quinones, quinone dioximes or dinitrosobenzene, optionally combined with organic accelerators and/or metal oxide(s)
  c) short fibers with a mean fiber length of 50 µm to 500 µm, preferably 100 µm to 250 µm, wherein the compound comprises 0.5 to 15 wt % of short fibers,
  d) optional additional additives selected from the group formed by thermoplastic polymers in the form of finely divided powders,
    fillers,
    light fillers,
    tackifiers and/or adhesion promoters,
    extender oils,
    aging inhibitors,
    rheology auxiliaries.

In the German patent application DE 10 2006 016577 there are described heat curable reactive compositions based on natural and/or synthetic olefinic double bond-containing elastomers and vulcanization agents which comprise at least one liquid polyene with a molecular weight between 400 and 80 000 as well as at least one polybutadiene with a narrow molecular weight distribution and a microstructure of 10 to 20% vinyl 1,2-double bonds, 50 to 60% trans 1,4-double bonds and 25 to 35% cis 1,4-double bonds in the molecule. In addition, these compositions comprise a vulcanization system of sulfur and accelerators and/or optionally quinone oximes. These compositions are suitable for use in vehicle construction as one-component adhesives, sealants or coating compounds with high tensile shear strengths and high impact peel strength, particularly at low temperatures. Acoustic attenuating behavior is not mentioned here.

WO 2009/036784 discloses an expanded and heat-curable material with acoustic attenuating properties, whose major components are two different styrene-isoprene-styrene copolymers with glass transition temperatures of −13° C. and +8° C. as well as a vulcanization system. The block copolymers that are used are solid at room temperature, such that compositions according to this document are likewise solid at room temperature. The compositions can be shaped at increased temperature by extrusion. Compounds that are pumpable at temperatures below 60° C. are not mentioned in this document and according to its teaching are evidently not obtained either.

One subject matter of the present invention is a thermally curable composition, comprising, based on the total composition a) 5 to 90 wt % of an olefinic double bond-containing polymer or copolymer based on diene and/or on an aromatically substituted olefin, wherein the polymer or copolymer is liquid or pasty at 22° C. and has a glass transition temperature, measured by a DSC method, between −30° C. and +15° C., preferably between −20 to +5° C., b) a vulcanization system selected from the group consisting of:

b1) sulfur and one or more accelerator(s),
b2) peroxidic or disulfidic vulcanization systems,
b3) quinones, quinone dioximes or dinitrosobenzene According to the invention, the term copolymer is understood to mean all polymers that are composed of two or more different monomers. In this regard, all configurations of the comonomers in the copolymer are generally inventively suitable for carrying out the present invention. In particular the block copolymers, but also the statistical copolymers (randomized copolymers), stand out due to their particularly advantageous properties in regard to the vibration damping characteristics. The statistical copolymers are inventively quite particularly preferred.

After the thermal curing the inventive composition exhibits intrinsic vibration damping characteristics. "Intrinsic vibration damping characteristics" is understood to mean the ability to convert mechanical vibrational energy into heat. The amplitude of an instigated vibration therefore decreases rapidly in a short space of time. This characteristic of the cured composition can be determined by measuring its vibrational damping behavior using a DMA method, as will be described below.

For the polymer or copolymer a), the attribute "liquid" is understood to mean that the product can be poured out of a container under the influence of gravity. A product that can be smoothed out to a uniform layer is designated as "pasty". The glass transition temperature for the polymers or copolymers a) is measured by "differential scanning calorimetry" (DSC), as they are not solid at room temperature. On the other hand, the glass transition temperatures given below of the cured complete composition that is solid at room temperature refer to their measurement by means of "dynamic mechanical analysis" (DMA).

The glass transition temperature of the cured compound is preferably in the range of about −5° C. to about +40° C., as then the vibrational damping behavior is optimal in the range of normal ambient temperatures. The glass transition temperature of the cured compound is measured with a dynamic mechanical analysis (DMA) as follows:

The measurement is carried out in accordance with DIN EN ISO 6721:

Measuring instrument: Metravib 01 dB DMA$^+$100
analysis software: Dynatest
sample dimensions: ca. 20×10×20 mm (w×h×t)
sample holder: parallel plate/plate
master curve: elongation/compression mode
  measured frequencies: 1; 2; 4; 8; 16; 31.5; 63; 125 Hz,
  form factor: <0.9
  preset amplitude: 10 μm
  dynamic deformation: 0.0005
Determination of the Glass Transition Temperature:
  1) A master curve was generated with the time-temperature superposition principle (according to DIN EN ISO 6721)
  2) The Tg (glass transition temperature) is that reference temperature at which the tan delta is at a maximum for a given frequency. The frequency selected for all measurements of Tg was 101 Hz For the description of the inventive composition, quantities in %, if not explicitly stated otherwise, mean wt % based on the total composition.

The amount of polymer or copolymer a), based on the total composition, is at least 10 wt % and in particular at least 15 wt %. Due to the preferred presence of the additional components described below, the upper limit is preferably at 60 wt % and especially at 45 wt %. Thus, the range between 15 and 45 wt % is particularly preferred.

Because of the particularly pronounced acoustic attenuation properties in the sense of a dissipative vibrational attenuation, i.e. the conversion of mechanical vibrational energy into heat, the polymer or copolymer a) is preferably a copolymer of styrene and a diene. The diene is preferably selected from butadiene, isoprene or mixtures thereof. In this regard, a pronounced dissipative vibrational attenuation is achieved when the copolymer a) possesses a styrene content, based on the total copolymer, of at least 10, preferably at least 15 wt %, and at most 60 wt %, preferably at most 50 wt %.

In a preferred embodiment of this subject matter, the polymer or copolymer a) is preferably a block copolymer of styrene and a diene. The diene is preferably selected from butadiene, isoprene or mixtures thereof. In this regard, a pronounced dissipative vibrational attenuation is achieved when the block copolymer a) possesses a styrene content, based on the total block copolymer, of at least 10, preferably at least 15 wt %, and at most 60 wt %, preferably at most 50 wt %.

In another preferred embodiment of this subject matter, the polymer or copolymer a) is preferably a statistical copolymer of styrene and a diene. The diene is preferably selected from butadiene, isoprene or mixtures thereof. In this regard, a pronounced dissipative vibrational attenuation is achieved when the statistical copolymer a) possesses a styrene content, based on the total copolymer, of at least 10, preferably at least 15 wt %, and at most 60 wt %, preferably at most 50 wt %.

The diene component can be unsubstituted. However, it can also possess substituents, in particular selected from carboxyl, hydroxyl and amino groups. The adhesion of the composition onto a metallic substrate can be improved in this way.

The polymer or copolymer a) should on the one hand be liquid or pasty at room temperature (22° C.), but on the other hand have a glass transition temperature that is not far below room temperature. In addition to the structural composition of the polymer or copolymer, the molecular mass of the polymer is also of importance for this. The desired combination of properties then arises in particular when the polymer or copolymer a) has a weight average molecular mass of at least 1000, preferably at least 2000 and especially at least 5000, and at most 50 000, preferably at most 35 000, especially at most 25 000. In this regard, the range 5000 to 18 000 is particularly preferred. In the context of this document, the average molecular mass is generally understood to mean the weight average molecular mass of polymers.

In the polymerization of dienes through the olefinic double bonds, a new olefinic double bond is formed within each monomer and can be arranged in different ways within the polymer chain. In the context of the present invention, because of the favorable combination of chemical properties (vulcanizability) and acoustic attenuation behavior, it is preferred that the polymer or copolymer a) comprises an unsaturated diene fraction formed by the polymerization of the diene and that the C=C double bonds in the diene fraction are constituted such that the vinyl fraction in the diene fraction is at least 20 mol %, preferably at least 40 mol % and at most 98 mol %, preferably at most 80 mol % (based on the totality of the olefinic double bonds).

In the context of the present invention, because of the favorable combination of chemical properties (vulcanizability) and acoustic attenuation behavior, it is particularly preferred that the polymer or copolymer a) comprises an unsaturated diene block formed by the polymerization of the diene and that the C=C double bonds in the diene block are constituted such that the vinyl fraction in the diene block is at least 20 mol %, preferably at least 40 mol % and at most 98 mol %, preferably at most 80 mol % (based on the totality of the olefinic double bonds)

The vulcanization system can be selected from the vulcanization systems known for the vulcanization of rubber. Thus in the alternative b1) it can comprise b1) sulfur and one or more accelerators.

Here, the powdered sulfur is preferably employed in amounts of 0.5 to 6.5 wt %, based on the total composition. Amounts between 1 and 4 wt % are particularly preferably employed. Dithiocarbamates (in the form of their ammonium or metal salts), xanthogenates, thiuram compounds (monosulfides and disulfides), thiazole compounds, aldehyde/amine accelerators (e.g. hexamethylenetetramine) as well as guanidine accelerators are suitable organic accelerators. Dibenzothiazyl disulfide (MBTS), 2-mercaptobenzthiazole (MBT), its zinc salt (ZMBT), zinc dibenzyldithiocarbamate (ZBEC), N-cyclohexylbenzodithiazyl sulfenamide (CBS) or diphenylguanidine are quite particularly preferred. The accelerators, including the previously cited and the additional zinc compounds cited in the following paragraph, are preferably used in amounts between 0.25 and 20 wt %, particularly preferably 0.8 and 12 wt %. In order to achieve particularly high temperature and reversion strengths of the adhesive, the vulcanization mixture can also comprise bifunctional crosslinkers. Specific examples are crosslinkers based on bifunctional dithiocarbamates such as e.g. 1,6-bis(N,N-dibenzylthiocarbamoyldithio)hexan. Such crosslinkers can be comprised in the compositions in amounts between 0 and 2, preferably between 0 and 1 wt %.

For the zinc compounds that act as accelerators, one may choose between the zinc salts of fatty acids, zinc dithiocarbamates, basic zinc carbonates as well as in particular finely divided zinc oxide. The content of zinc compounds is in the range between 0.5 and 10 wt %, preferably between 2 and 8 wt %. These zinc compounds can be employed in combination with the accelerators cited in the previous paragraph and this is also preferred. In addition, further typical rubber vulcanization auxiliaries such as fatty acids (e.g. stearic acid) can be present in the formulation.

However, the vulcanization system can also be free of elemental sulfur. For example, b2) peroxides, preferably organic peroxides that are known for this purpose can be added as the vulcanization system. Examples are: dibenzoyl peroxide, tert-butyl peroxy benzoate, and in particular 1,1-di-(tert-butyl peroxy)-3,3,5-trimethylcyclohexane, butyl-4,4-di-(tert-butyl peroxy)valeriate, dicumyl peroxide, di-(2-tert-butyl-peroxyisopropyl)benzene, tert-butyl cumyl peroxide, 2,5-dimethyl-2,5-di-(tert-butyl peroxy)hexane, di-tert-butyl peroxide, 2,5-dimethyl-2,5-di(tert-butyl peroxy)hex-3-yne and crosslinking agents such as triallyl isocyanurate.

Instead of peroxides, "disulfidic" vulcanization systems, i.e. vulcanization systems based on disulfides, can also be employed. Thiuram disulfides are suitable for example.

The added quantities are preferably:
0.3-4.5 wt % in the case of peroxides,
0.2-5 wt % in the case of disulfides Further alternatives can be used as the vulcanization system:

b3) quinones, quinone dioximes, in particular p-benzoquinone dioxime, nitrosobenzene or dinitrosobenzene, especially p-dinitrosobenzene.

These are also known from the vulcanization of rubber.

According to the invention, a combined vulcanization system of elementary sulfur, the above cited organic accelerators and quinone dioximes can also be employed. p-Benzoquinone dioxime may be mentioned as an example. However, other quinone dioximes can also be used in combination with the abovementioned sulfur systems. The vulcanization system can also consist solely of quinone dioximes. The added quantity is preferably 1.5-6.0 wt %, especially for quinone dioximes, independently of whether these are employed together with sulfur or not.

In a preferred embodiment, the composition additionally comprises, based on the total composition c) 10 to 45 wt %, preferably 15 to 40 wt % and in particular 25 to 36 wt % filler.

The fillers can be selected from a great number of materials. The following may be cited in particular: chalks, natural or ground calcium carbonates, calcium magnesium carbonates, silica, silicates, talcum, barytes as well as carbon black. It can be advantageous for at least some of the fillers to be surface treated. In particular it has proven advantageous to coat the various calcium carbonates or chalks with stearic acid so as to reduce the incorporated moisture and to reduce the moisture sensitivity of the cured composition. In particular, fillers with a high aspect ratio (=flaky fillers with a low thickness in comparison with the dimension in the plane of the flake: the thickness perpendicular to the plane of the flake is maximum 1/10 of the smallest dimension in the plane of the flake), such as layered silicates, particularly preferably mica, talc and graphite have proven to be favorable for good acoustic attenuating properties.

The compositions according to the invention can further comprise, in addition to these fillers, between 0 and 8 wt %, preferably between 1 and 6 wt % of calcium oxide for binding moisture.

The composition according to the invention is preferably formulated such that it irreversibly expands ("foams", "blows") during or prior to the thermal curing. This causes an irreversible volume increase that enables cavities or intermediate spaces to be more completely filled up with the cured compound. For this purpose it is preferred that the composition comprises so-called blowing agent (component d).

In principle all known blowing agents are suitable as the blowing agent, such as, e.g., the "chemical blowing agents", which release gases by decomposition, or "physical blowing agents", i.e. expanding hollow beads. Examples of the firstmentioned blowing agents are azobisisobutyronitrile, azodicarbonamide, di-nitrosopentamethylenetetramine, 4,4'-oxybis(benzene-sulfonic acid hydrazide), diphenylsulfone-3,3'-disulfohydrazide, benzene-1,3-disulfohydrazide, p-toluene sulfonyl semicarbazide. The expandable plastic hollow microspheres are particularly preferably based on polyvinylidene chloride copolymers or acrylonitrile/(meth)acrylate copolymers. These are commercially available for example under the names "Dualite®" or "Expancel®" from Pierce & Stevens and Casco Nobel respectively.

The amount of blowing agent is preferably selected such that the volume of the compound when heated to the activation temperature (or expansion temperature) irreversibly increases by at least 10%, preferably at least 50% and particularly at least 100%. This is understood to mean that the compound, in addition to the normal and reversible thermal expansion according to its thermal expansion coefficient, on heating to the activation temperature irreversibly increases its volume in comparison with the starting volume at room temperature (22° C.) such that after cooling down to room temperature it is at least 10%, preferably at least 50% and particularly at least 100% larger than before. The cited degree of expansion therefore relates to the volume of the compound at room temperature before and after the temporary heating up to the activation temperature. The upper limit of the degree of expansion, i.e. the irreversible volume increase, can be adjusted by choosing the amount of the blowing agent such that the expansion degree is at 600%, particularly at 300%. A degree of foaming in the range 100 to 300% is therefore preferred. The degree of foaming can be determined by comparing volumes (without spatial limitation for foaming, i.e. the foaming occurs in three dimensions) or by comparing the densities before and after foaming. At least one of these methods should provide a value in the above cited range.

The amount of blowing agent required for this depends on the exact type of blowing agent and can be set empirically or based on the manufacturer's recommendations. As an indication, it can be said that for the application purpose presented here, the composition according to the invention comprises, based on the total composition, up to 6 wt %, preferably up to 4 wt %, and preferably at least 0.2 wt % blowing agent.

In another preferred embodiment, the composition additionally comprises, based on the total composition,
e) up to 12 wt %, preferably up to 9 wt % and in particular up to 5 wt %, and preferably at least 1 wt % solid rubber and/or thermoplastic polymer and/or
f) up to 25 wt %, preferably up to 12 wt %, and preferably at least 1 wt %, in particular at least 2.5 wt % polydiene (preferably polybutadiene) with a molecular mass in the range 1000 to 10 000, which possesses carboxyl, hydroxyl or amine groups. Preferably, both these components e) and f) are simultaneously present. Both components improve the tenacity of the cured composition, wherein the component f) due to the carboxyl groups further improves the adhesion to metallic substrates.

In particular, solid rubbers based on polybutadiene, preferably with a very high content of cis-1,4-double bonds (typically over 85%), styrene-butadiene rubber (styrene-butadiene-styrene copolymers, SBS), butadiene-acrylonitrile rubber, styrene-isoprene rubbers (styrene-isoprene-styrene copolymers SIS), styrene-ethylene/propylene-styrene copolymers, SEPS, styrene-ethylene/ethylene/propylene-styrene copolymers, SEEPS, synthetic or natural isoprene rubber, polycyclooctenamer, butyl rubber or polyurethane rubber are suitable as the component e)

The acoustic attenuation properties of the compositions according to the invention are improved when they additionally comprise, based on the total composition,
g) up to 40 wt %, preferably up to 30 wt % and in particular up to 25 wt %, and preferably at least 2 wt %, in particular at least 5 wt % hydrocarbon resin.

The hydrocarbon resin contributes to bring the glass transition temperature of the cured compound into the desired range of about −5° C. to about +40° C. Then the acoustic attenuation is particularly pronounced at the usual ambient temperatures. The resins can be totally aliphatic or totally aromatic or they can possess aliphatic and aromatic structures. Moreover they can be aromatically modified aliphatic resins. In each case the compatibility with the polymer matrix is essential. Exemplary employable commercial products are Escorez™ 1102, Escorez™ 2173, Escorez™ 2184, Escorez™ 2101, Escorez™ 2105, Novares™ TK, Novares™ TV, Novares™ TA, Novares™ TP, Novares™ TR, Novares™ TS, Novares™ TW and Nevtac™ 10.

Resins having a softening point>10° C., preferably having a softening point>40° C. and especially having a softening point>70° C., which are compatible with the polymer matrix, contribute to shifting the glass transition temperature into the desired range of about −5 to about +40° C. and increase the maximum of the tan delta.

In order to improve the processability of the uncured composition and in order to improve the mechanical properties of the cured composition it is preferred that the uncured composition additionally comprises
h) up to 40 wt %, preferably up to 30 wt % and in particular up to 25 wt %, and preferably at least 2 wt %, in particular at least 5 wt % plasticizer.

For this, examples of known plasticizers can be considered, for example phthalic acid esters, hydrocarbon oils such as for example white oil, natural oils that are liquid at 22° C. (fatty acid glycerin esters such as for example the so-called triglycerides, e.g. rape seed oil, soya oil, walnut oil, linseed oil, sunflower oil, olive oil, etc.).

In particular, the simultaneous presence of components g) and h) in the composition improve the acoustic attenuation properties, i.e. increase the maximum of the loss factor tangent delta in the desired range of about −5 to about +40° C. and broaden the peak of the tangent delta.

The compositions according to the invention can additionally comprise reinforcing fillers, preferably based on aramid fibers, carbon fibers, glass fibers, polyamide fibers, polyethylene fibers or polyester fibers, wherein these fibers are preferably short fibers in the form of pulp fibers or staple fibers. In this regard the fibers should particularly preferably have an average fiber length between 100 μm and 250 μm and a diameter of 5 to 20 μm. Here, the longest fibers should not exceed 1000 μm to 2000 μm. Particularly preferred here are glass fibers, polyamide fibers of the aramid fiber type or also polyester fibers. The fiber content of the composition, if fibers are present, is preferably 0.5 to 10 wt %.

The composition preferably additionally comprises, besides the essential components cited in claim 1, at least one of the components c) to h), such that the composition corresponds to at least one of the combinations: a)+b)+c), a)+b)+d), a)+b)+e), a)+b)+f), a)+b)+g), a)+b)+h). The composition according to the invention particularly preferably comprises all of the above cited components a) to h) in the given quantities at the same time, wherein, however, only one of the cited systems b1), b2) or b3) must be present.

The following Table provides an overview of possible inventive compositions:

| Component | General composition | Preferred composition | Particularly preferred composition |
|---|---|---|---|
| Solid rubber | 0-12% | 0-9% | 1.5-5.0% |
| Acoustically attenuating polymer or copolymer (preferably block copolymer) | 5-65% | 10-50% | 15-45% |
| Polybutadiene with active carboxyl groups (MW = 1000-10 000 g/mol) | 0-25% | 1-12% | 2.5-9% |
| Plasticizer | 0-40% | 2-30% | 5-25% |
| Hydrocarbon resin | 0-40% | 2-30% | 5-25% |
| Sulfur | 0.5-6.5% | 0.8-4.0% | 1.0-3.0% |
| Vulcanization accelerator (MBTS, MBT, ZMBT, ZBEC, CBS etc.) | 0.25-7.5% | 0.5-5% | 0.8-4% |
| Chemical blowing agent (incl. activator) | 0-6% | 0.2-4% | 0.5-3% |
| Physical blowing agent | 0-6% | 0-4% | 0-1.5% |
| Zinc oxide | 0-10% | 0-8% | 0.5-7% |
| Hexamethylene-1,6-bis(thiosulfate) disodium salt | 0-2.5% | 0.1-1.8% | 0.4-1.3% |
| Antioxidant (e.g. 2,2-methylene-bis(4-methyl-6-tert-butylphenol)) | 0-1.5% | 0.1-1.0% | 0.2-0.7% |
| Calcium oxide | 0-8% | 1-6% | 2.5-5.5% |
| Carbon black | 0-5% | 0.1-3% | 0.3-2% |
| Filler (calcium carbonate, graphite, talc, mica, etc.) | 10-45% | 15-40% | 25-36% |
| Calcium carbonate, coated | 0-30% | 0-18% | 0-12% |

In addition, fibers, additional or other typical accelerators, other crosslinking agents such as peroxides or benzoquinone dioxime, other antioxidants, co-activators and additional catalysts, blowing agents, oils, resins, anti-aging additives, rheology auxiliaries, adhesion promoters, pigments and thermoplastic polymers (SEPS, SEEPS, PE, PP, PVC, TPU) can be comprised.

In a second preferred embodiment, the compositions according to the invention satisfy the following boundary conditions:

| Component | Particularly preferred composition |
|---|---|
| Solid rubber | 4.0-6.0% |
| Acoustically attenuating polymer or copolymer (preferably statistical copolymer) | 6.0-12.0% |
| Polybutadiene with active carboxyl groups (MW = 1000-10 000 g/mol) | 5.0-8.0% |
| Plasticizer (e.g. natural oils, diisononyl phthalate) | 10-18% |
| Hydrocarbon resin | 16-21% |
| Sulfur | 1.0-3.0% |
| Quinone crosslinker | 0-3.0% |
| Vulcanization accelerator (MBTS, MBT, ZMBT, ZBEC, CBS, etc.) | 2.0-4.2% |
| Chemical blowing agent (incl. activator) | 0.5-4.0% |
| Physical blowing agent | 0-1.5% |
| Zinc oxide | 0-7% |
| Hexamethylene-1,6-bis(thiosulfate) disodium salt | 0-1.0% |
| Antioxidant (e.g. 2,2-methylene-bis(4-methyl-6-tert-butylphenol)) | 0.2-1.0% |
| Calcium oxide | 2.5-5.5% |
| Carbon black | 0.3-2.5% |
| Filler (calcium carbonate, graphite, talc, mica, etc.) | 20-32% |
| Calcium carbonate, coated | 0-12% |
| Rheology auxiliaries (e.g. silicas, hydrogenated castor oil) | 0-5.0 |

The advantage of the composition according to the invention is that with a suitably selected ratio of components that are liquid and solid at 22° C., it can be adjusted such that it can be applied automatically (e.g. with robots) or manually with standard application equipment for adhesives and sealants in the automobile industry at a temperature of up to 60° C. For this, the decisive factor is that the olefinic double bond-containing polymers or copolymers a) are liquid or pasty at 22° C.

Therefore, the composition according to the invention is preferably characterized in that its viscosity at a temperature in the range 15 to 60° C. is such that it can be pumped with a pump (e.g. a rotary pump, gear pump or scoop piston pump, as are typical of the cited standard application equipment).

Another aspect of the present invention concerns the application of the composition according to the invention. Consequently, the invention also includes a process for the application of the composition according to the invention, wherein the composition is delivered at a temperature in the range 15 to 60° C. by a pump (for examples of pumps, see above) to the point of application and is coated in the liquid or pasty state onto a lubricated, untreated or cleaned substrate.

After application the composition according to the invention can be thermally cured, for which the ovens that are typically available in the industrial segment of vehicle construction and equipment construction for baking paint coatings can be used. The activation temperature for the thermal curing and optionally the foaming is preferably in the range 120 to 220° C. This temperature should preferably be maintained for a period of 10 to 150 minutes.

After the compound has been cured, the glass transition temperature of the cured compound, as measured with a DMA method (see above), is preferably in the range −5° C. to +40° C. The acoustic attenuation is then particularly pronounced at the usual ambient temperatures. The maximum loss factor tan δ, measured with a DMA method in the frequency range 0 to 500 Hz at a temperature in the range −5° C. to +40° C., (for details of the measurement, see the experimental part) is at least 0.50, preferably at least 0.9, particularly at least 1.1, which reflects the good acoustic attenuation properties. "At a temperature in the range −5° C. to +40° C." means that the cited minimum value for tan δ is achieved at any temperature in the cited range.

The storage modulus E' of the cured compound is in the range 0.1-10 000 MPa for a loss factor tan delta of at least 0.50, preferably at least 0.9 and particularly 1.1 and the storage modulus G' is in the range 0.1-10 000 MPa at a frequency of 0 to 500 Hz.

Furthermore, after curing, the composition according to the invention exhibits good coating properties (no indentations on components) as well as a satisfactory hardness: Shore A<30).

The Shore hardness measurement for elastomers is defined in the standard DIN 53505. In the Shore hardness measurement, the depth of penetration of a needle with a blunt tip into the test material serves as a measure of the corresponding Shore hardness that is measured on a scale of 0 Shore to 100 Shore (0 millimeter penetration depth). The dwell time is 3 seconds.

The compositions are used in particular as underlays as well as adhesives and sealants for structural attachments such as doors, engine hoods and trunk lids, roof, front and chassis areas, but also directly in the passenger compartment for vehicles (automobiles, HGV, bus) or for the production of railcars. They can also be used in equipment construction when acoustic vibrations that can emanate from motors, gears or pumps (generally from vibrations generated by rotating machines) should be attenuated. Consequently, the present invention also includes the use of a composition according to the invention as an acoustic attenuating material in vehicle and equipment construction.

In a generalized aspect, the present invention relates to a composition that is thermally curable at a temperature of 15 to 60° C., that is pumpable (for example with a rotary pump, gear pump or scoop piston pump), comprising, based on the total composition a) 5 to 90 wt % of an olefinic double bond-containing polymer or copolymer that is liquid or pasty at 22° C., b) a vulcanization system selected from the group consisting of:

b1) sulfur and one or more accelerator(s), b2) peroxidic vulcanization systems b3) quinones, quinone dioximes, nitrosobenzene or dinitrosobenzene, wherein after the thermal curing, the composition has a loss factor tan δ, measured by a DMA method, of at least 0.50, preferably at least 0.9 and particularly at least 1.1 in the temperature range −5° C. to +40° C. In this regard, both the chemical nature as well as the preferred addition ranges described above apply to the vulcanization system b) as well as to the additional possible active substances and auxiliaries. This applies correspondingly for the type of application, the curing and the field of application.

1 EXAMPLES

The following tables comprise comparative examples and examples of inventive compositions, data on curing and foaming behaviour, as well as on the acoustic attenuation properties, reflected in the loss factor tan δ. The measurement method is a DMA method in accordance with DIN EN ISO 6721, as was described above. Unless otherwise stated, the quantities are understood to be in weight percent.

Expansion rates were open, i.e. determined without geometric limitation of the sample, by comparing the volume of the sample before and after foaming and curing (at the respective temperature given in the tables).

1.1 Comparative Examples

1.1.1 Comparative example 1

| | |
|---|---|
| Rape seed oil | 8.7 wt % |
| Polystyrene-polyisoprene block copolymer, Tg −63° C., styrene content 17 wt %, Mw: 31 000 g/mol | 30.7 wt % |
| Polybutadiene cis-1,4- (solid) | 5.2 wt % |
| Polybutadiene with active carboxyl groups (MW = 2100 g/mol) | 2.8 wt % |
| Graphite | 32.7 wt % |
| 2,2-Methylene-bis(4-methyl-6-tert-butylphenol) | 0.4 wt % |
| Carbon black | 1.8 wt % |
| Silica | 1.0 wt % |
| Calcium oxide | 3.0 wt % |
| Expandable hollow microspheres | 2.1 wt % |
| Azodicarbonamide | 1.9 wt % |
| Oxy-bis-sulfo-hydrazide (4,4'-oxybis(benzenesulfonic hydrazide)) | 1.9 wt % |
| Benzene sulfonic acid, zinc salt | 0.10 wt % |
| Benzoquinone dioxime | 2.1 wt % |
| ZBEC | 2.9 wt % |
| Sulphur | 2.0 wt % |
| MBTS | 0.7 wt % |
| Tg Product | <−15° C. |
| tan delta @ 20° C. | 0.15 |
| max. tan delta | 0.41 |
| Shore A | 19 |
| Expansion (30 min @ 180° C.) | 250% |

1.1.2 Comparative Example 2

| | |
|---|---|
| Rape seed oil | 8.7 wt % |
| Polyisoprene, Tg −63° C., Mw: 29 000 g/mol | 30.7 wt % |
| Polybutadiene cis-1,4- (solid) | 5.2 wt % |
| Polybutadiene with active carboxyl groups (MW = 2100 g/mol) | 2.8 wt % |
| Graphite | 32.7 wt % |
| 2,2-Methylene-bis-(4-methyl-6-tert-butylphenol) | 0.4 wt % |
| Carbon black | 1.8 wt % |
| Silica | 1.0 wt % |
| Calcium oxide | 3.0 wt % |
| Expandable hollow microspheres | 2.1 wt % |
| Azodicarbonamide | 1.9 wt % |
| Oxy-bis-sulfo-hydrazide (4,4'-oxybis(benzenesulfonic hydrazide)) | 1.9 wt % |
| Benzene sulfonic acid, zinc salt | 0.10 wt % |
| Benzoquinone dioxime | 2.1 wt % |
| ZBEC | 2.9 wt % |
| Sulphur | 2.0 wt % |
| MBTS | 0.7 wt % |
| Tg Product | <−15° C. |
| tan delta @ 20° C. | 0.15 |
| max. tan delta | 0.27 |
| Shore A | 19 |
| Expansion (30 min @ 180° C.) | 195% |

1.1.3 Comparative Example 3

| | |
|---|---|
| Rape seed oil | 8.7 wt % |
| Polyisoprene, Tg −25° C., Mw: 29 000 g/mol | 30.7 wt % |
| Polybutadiene cis-1,4- (solid) | 5.2 wt % |
| Polybutadiene with active carboxyl groups (MW = 2100 g/mol) | 2.8 wt % |
| Graphite | 32.7 wt % |
| 2,2-Methylene-bis-(4-methyl-6-tert-butylphenol) | 0.4 wt % |
| Carbon black | 1.8 wt % |
| Silica | 1.0 wt % |
| Calcium oxide | 3.0 wt % |
| Expandable hollow microspheres | 2.1 wt % |
| Azodicarbonamide | 1.9 wt % |
| Oxy-bis-sulfo-hydrazide (4,4'-oxybis(benzene sulfonic hydrazide)) | 1.9 wt % |
| Benzene sulfonic acid, zinc salt | 0.10 wt % |
| Benzoquinone dioxime | 2.1 wt % |
| ZBEC | 2.9 wt % |
| Sulphur | 2.0 wt % |
| MBTS | 0.7 wt % |
| Tg Product | −15° C. |
| tan delta @ 20° C. | 0.21 |
| max. tan delta | 0.55 |
| Shore A | 45 |
| Expansion (30 min @ 180° C.) | 163% |

1.1.4 Comparative Example 4

| | |
|---|---|
| Liquid polybutadiene (MW = 1000 g/mol) | 2.0 wt % |
| Polybutadiene cis-1,4- (solid) | 7.8 wt % |
| Polybutadiene with active carboxyl groups (MW = 2100 g/mol) | 4.0 wt % |
| Polybutadiene with active carboxyl groups (MW = 1300 g/mol) | 1.5 wt % |
| Liquid polybutadiene (MW = 2200 g/mol) | 23.5 wt % |
| Chalk | 31.8 wt % |
| Coated chalk | 17.3 wt % |
| 2,2-Methylene-bis-(4-methyl-6-tert- | 0.5 wt % |

-continued

| | |
|---|---|
| butylphenol) | |
| Carbon black | 0.5 wt % |
| Zinc oxide | 3.0 wt % |
| Calcium oxide | 2.5 wt % |
| Expandable hollow microspheres | 0.5 wt % |
| Azodicarbonamide | 1.5 wt % |
| Benzene sulfonic acid, zinc salt | 0.1 wt % |
| Sulphur | 2.5 wt % |
| MBTS | 1.0 wt % |
| Tg Product | −10° C. |
| tan delta @ 20° C. | 0.11 |
| max. tan delta | 0.16 |
| Shore A | 50 |
| Expansion (30 min @ 180° C.) | 140% |

1.2 Inventive Compositions

1.2.1 Example 1

| | |
|---|---|
| Rape seed oil | 8.7 wt % |
| Polystyrene-polybutadiene block copolymer, Tg −14° C., styrene content 22 wt %, vinyl fraction 65 mol %, Mw 8400 g/mol | 30.8 wt % |
| Polybutadiene cis-1,4- (solid) | 5.2 wt % |
| Polybutadiene with active carboxyl groups (MW = 2100 g/mol) | 2.8 wt % |
| Graphite | 32.8 wt % |
| 2,2-Methylene-bis-(4-methyl-6-tert-butylphenol) | 0.4 wt % |
| Carbon black | 1.7 wt % |
| Silica | 1.0 wt % |
| Calcium oxide | 3.0 wt % |
| Expandable hollow microspheres | 2.0 wt % |
| Azodicarbonamide | 1.9 wt % |
| Oxy-bis-sulfo-hydrazide (4,4'-oxybis(benzene sulfonic hydrazide)) | 1.9 wt % |
| Benzene sulfonic acid, zinc salt | 0.10 wt % |
| Benzoquinone dioxime | 2.1 wt % |
| ZBEC | 3.9 wt % |
| Sulphur | 2.0 wt % |
| MBTS | 0.7 wt % |
| Tg Product | 0° C. |
| tan delta @ 20° C. | 0.57 |
| max. tan delta | 0.68 |
| Shore A | 15 |
| Expansion (30 min @ 180° C.) | 553% |

1.2.2 Example 2

| | |
|---|---|
| Rape seed oil | 8.7 wt % |
| Polystyrene-polybutadiene block copolymer, Tg −14° C., styrene content 22 wt %, vinyl fraction 65 mol %, Mw 8400 g/mol | 30.8 wt % |
| Polybutadiene cis-1,4- (solid) | 5.2 wt % |
| Polybutadiene with active carboxyl groups (MW = 2100 g/mol) | 2.8 wt % |
| Graphite | 32.8 wt % |
| 2,2-Methylene-bis-(4-methyl-6-tert-butylphenol) | 0.4 wt % |
| Carbon black | 1.7 wt % |
| Silica | 1.0 wt % |
| Calcium oxide | 3.0 wt % |
| Expandable hollow microspheres | 0.9 wt % |
| Azodicarbonamide | 1.0 wt % |
| Oxy-bis-sulfo-hydrazide (4,4'-oxybis(benzene sulfonic hydrazide)) | 2.9 wt % |
| Benzene sulfonic acid, zinc salt | 0.10 wt % |
| Benzoquinone dioxime | 2.1 wt % |
| ZBEC | 3.9 wt % |
| Sulphur | 2.0 wt % |
| MBTS | 0.7 wt % |
| Tg Product | 0° C. |
| tan delta @ 20° C. | 0.60 |
| max. tan delta | 0.75 |
| Shore A | 20 |
| Expansion (30 min @ 180° C.) | 284% |

1.2.3 Example 3

| | |
|---|---|
| Rape seed oil | 8.9 wt % |
| Polystyrene-polybutadiene block copolymer, Tg −14° C., styrene content 22 wt %, vinyl fraction 65 mol %, Mw 8400 g/mol | 41.8 wt % |
| Polybutadiene cis-1,4- (solid) | 5.4 wt % |
| Polybutadiene with active carboxyl groups (MW = 2100 g/mol) | 2.9 wt % |
| Graphite | 23.9 wt % |
| 2,2-Methylene-bis-(4-methyl-6-tert-butylphenol) | 0.4 wt % |
| Carbon black | 1.8 wt % |
| Silica | 1.0 wt % |
| Calcium oxide | 3.1 wt % |
| Expandable hollow microspheres | 0.9 wt % |
| Azodicarbonamide | 1.0 wt % |
| Oxy-bis-sulfo-hydrazide (4,4'-oxybis(benzene sulfonic hydrazide)) | 0.8 wt % |
| Benzene sulfonic acid, zinc salt | 0.1 wt % |
| Benzoquinone dioxime | 2.2 wt % |
| ZBEC | 3.0 wt % |
| Sulphur | 2.1 wt % |
| MBTS | 0.7 wt % |
| Tg Product | 4.5° C. |
| tan delta @ 20° C. | 0.93 |
| max. tan delta | 0.96 |
| Shore A | 23 |
| Expansion (30 min @ 180° C.) | 195% |

1.2.4 Example 4

| | |
|---|---|
| Rape seed oil | 8.9 wt % |
| Polystyrene-polybutadiene block copolymer, Tg −14° C., styrene content 22 wt %, vinyl fraction 65 mol %, Mw 85 400 g/mol | 31.8 wt % |
| Polybutadiene cis-1,4- (solid) | 5.4 wt % |
| Polybutadiene with active carboxyl groups (MW = 2100 g/mol) | 2.9 wt % |
| Muscovite mica | 33.9 wt % |
| 2,2-Methylene-bis-(4-methyl-6-tert-butylphenol) | 0.4 wt % |
| Carbon black | 1.8 wt % |
| Silica | 1.0 wt % |
| Calcium oxide | 3.1 wt % |
| Expandable hollow microspheres | 0.9 wt % |
| Azodicarbonamide | 1.0 wt % |
| Oxy-bis-sulfo-hydrazide (4,4'-oxybis(benzene sulfonic hydrazide)) | 0.9 wt % |
| Benzene sulfonic acid, zinc salt | 0.1 wt % |
| Benzoquinone dioxime | 2.2 wt % |
| ZBEC | 3.0 wt % |
| Sulphur | 2.1 wt % |
| MBTS | 0.7 wt % |
| Tg Product | 4.5° C. |
| tan delta @ 20° C. | 0.99 |
| max. tan delta | 1.04 |
| Shore A | 23 |
| Expansion (30 min @ 180° C.) | 185% |

1.2.5 Example 5

| | |
|---|---|
| Rape seed oil | 8.9 wt % |
| Polystyrene-polybutadiene block copolymer, Tg −7° C., styrene content 40 wt %, vinyl fraction 55 mol %, Mw 10 300 g/mol | 41.8 wt % |
| Polybutadiene cis-1,4- (solid) | 5.4 wt % |
| Polybutadiene with active carboxyl groups (MW = 2100 g/mol) | 2.9 wt % |
| Graphite | 23.9 wt % |
| 2,2-Methylene-bis-(4-methyl-6-tert-butylphenol) | 0.4 wt % |
| Carbon black | 1.8 wt % |
| Silica | 1.0 wt % |
| Calcium oxide | 3.1 wt % |
| Expandable hollow microspheres | 0.9 wt % |
| Azodicarbonamide | 1.0 wt % |
| Oxy-bis-sulfo-hydrazide (4,4'-oxybis(benzene sulfonic hydrazide)) | 0.9 wt % |
| Benzene sulfonic acid, zinc salt | 0.1 wt % |
| Benzoquinone dioxime | 2.2 wt % |
| ZBEC | 3.0 wt % |
| Sulphur | 2.1 wt % |
| MBTS | 0.7 wt % |
| Tg Product | 10° C. |
| tan delta @ 20° C. | 0.94 |
| max. tan delta | 0.95 |
| Shore A | 16 |
| Expansion (30 min @ 180° C.) | 196% |

1.2.6 Example 6

| | |
|---|---|
| Rape seed oil | 8.9 wt % |
| Polystyrene-polybutadiene block copolymer, Tg −7° C., styrene content 40 wt %, vinyl fraction 55 mol %, Mw 10 300 g/mol | 41.8 wt % |
| Polybutadiene cis-1,4- (solid) | 5.4 wt % |
| Polybutadiene with active carboxyl groups (MW = 2100 g/mol) | 2.9 wt % |
| Muscovite mica | 23.9 wt % |
| 2,2-Methylene-bis-(4-methyl-6-tert-butylphenol) | 0.4 wt % |
| Carbon black | 1.8 wt % |
| Silica | 1.0 wt % |
| Calcium oxide | 3.1 wt % |
| Expandable hollow microspheres | 0.9 wt % |
| Azodicarbonamide | 1.0 wt % |
| Oxy-bis-sulfo-hydrazide (4,4'-oxybis(benzene sulfonic hydrazide)) | 0.9 wt % |
| Benzene sulfonic acid, zinc salt | 0.1 wt % |
| Benzoquinone dioxime | 2.2 wt % |
| ZBEC | 3.0 wt % |
| Sulphur | 2.1 wt % |
| MBTS | 0.7 wt % |
| Tg Product | 12° C. |
| tan delta @ 20° C. | 1.25 |
| max. tan delta | 1.26 |
| Shore A | 14 |
| Expansion (30 min @ 180° C.) | 148% |

1.2.7 Example 7

| | |
|---|---|
| Diisononyl phthalate | 8.9 wt % |
| Polystyrene-polybutadiene block copolymer, Tg −7° C., styrene content 40 wt %, vinyl fraction 55 mol %, Mw 10 300 g/mol | 41.8 wt % |
| Polybutadiene cis-1,4- (solid) | 5.4 wt % |
| Polybutadiene with active carboxyl groups (MW = 2100 g/mol) | 2.9 wt % |
| Muscovite mica | 24.7 wt % |
| 2,2-Methylene-bis-(4-methyl-6-tert-butylphenol) | 0.4 wt % |
| Carbon black | 1.8 wt % |
| Silica | 1.0 wt % |
| Calcium oxide | 3.1 wt % |
| Azodicarbonamide | 1.0 wt % |
| Oxy-bis-sulfo-hydrazide (4,4-oxybis(benzene sulfonic hydrazide)) | 0.9 wt % |
| Benzene sulfonic acid, zinc salt | 0.1 wt % |
| Benzoquinone dioxime | 2.2 wt % |
| ZBEC | 3.0 wt % |
| Sulphur | 2.1 wt % |
| MBTS | 0.7 wt % |
| Tg Product | 14° C. |
| tan delta @ 20° C. | 1.26 |
| max. tan delta | 1.29 |
| Shore A | 15 |
| Expansion (30 min @ 180° C.) | 159% |

1.2.8 Example 8

| | |
|---|---|
| Rape seed oil | 8.9 wt % |
| Polystyrene-polybutadiene block copolymer, Tg −14° C., styrene content 22 wt %, vinyl fraction 65 mol %, Mw 8 400 g/mol | 41.8 wt % |
| Polybutadiene cis-1,4- (solid) | 5.4 wt % |
| Polybutadiene with active carboxyl groups (MW = 2100 g/mol) | 2.9 wt % |
| Graphite | 25.8 wt % |
| 2,2-Methylene-bis-(4-methyl-6-tert-butylphenol) | 0.4 wt % |
| Carbon black | 1.8 wt % |
| Silica | 1.0 wt % |
| Calcium oxide | 3.1 wt % |
| Expandable hollow microspheres | 0.9 wt % |
| Benzoquinone dioxime | 2.2 wt % |
| ZBEC | 3.0 wt % |
| Sulphur | 2.1 wt % |
| MBTS | 0.7 wt % |
| Tg Product | 2° C. |
| tan delta @ 20° C. | 0.91 |
| max. tan delta | 0.93 |
| Shore A | 23 |
| Expansion (30 min @ 180° C.) | 46% |

1.2.9 Example 9

| | |
|---|---|
| Diisononyl phthalate | 8.9 wt % |
| Polystyrene-polybutadiene block copolymer, Tg −7° C., styrene content 40 wt %, vinyl fraction 55 mol %, Mw 10 300 g/mol | 41.8 wt % |
| Polybutadiene cis-1,4- (solid) | 5.4 wt % |
| Polybutadiene with active carboxyl groups (MW = 2100 g/mol) | 2.9 wt % |
| Muscovite mica | 24.7 wt % |
| 2,2-Methylene-bis-(4-methyl-6-tert-butylphenol) | 0.4 wt % |
| Carbon black | 1.8 wt % |
| Silica | 1.0 wt % |
| Calcium oxide | 3.1 wt % |
| Azodicarbonamide | 1.0 wt % |
| Oxy-bis-sulfo-hydrazide (4,4'-oxybis(benzene sulfonic hydrazide)) | 0.9 wt % |
| Benzene sulfonic acid, zinc salt | 0.1 wt % |
| Benzoquinone dioxime | 2.2 wt % |
| ZBEC | 3.0 wt % |
| Sulphur | 2.1 wt % |
| MBTS | 0.7 wt % |
| Tg Product | 8.5° C. |
| tan delta @ 20° C. | 1.26 |
| max. tan delta | 1.29 |
| Shore A | 17 |
| Expansion (30 min @ 180° C.) | 159% |

1.2.10 Example 10

| | |
|---|---|
| Diisononyl phthalate | 8.9 wt % |
| Polystyrene-polybutadiene block copolymer, Tg −7° C., styrene content 40 wt %, vinyl fraction 55 mol %, Mw 10 300 g/mol | 41.8 wt % |
| Polybutadiene cis-1,4- (solid) | 5.4 wt % |
| Polybutadiene with active carboxyl groups (MW = 2100 g/mol) | 2.9 wt % |
| Aromatically modified aliphatic hydrocarbon resin, Tg = 48° C., softening point 95-101° C. | 8.9 wt % |
| Muscovite mica | 15.8 wt % |
| 2,2-Methylene-bis-(4-methyl-6-tert-butylphenol) | 0.4 wt % |
| Carbon black | 1.8 wt % |
| Silica | 1.0 wt % |
| Calcium oxide | 3.1 wt % |
| Azodicarbonamide | 1.0 wt % |
| Oxy-bis-sulfo-hydrazide (4,4'-oxybis(benzene sulfonic hydrazide)) | 0.9 wt % |
| Benzene sulfonic acid, zinc salt | 0.1 wt % |
| Benzoquinone dioxime | 2.2 wt % |
| ZBEC | 3.0 wt % |
| Sulphur | 2.1 wt % |
| MBTS | 0.7 wt % |
| Tg Product | 20.3° C. |
| tan delta @ 20° C. | 1.32 |
| max. tan delta | 1.49 |
| Shore A | 12 |
| Expansion (30 min @ 180° C.) | 140% |

1.2.11 Example 11

| | |
|---|---|
| Rape seed oil | 8.9 wt % |
| Polystyrene-polybutadiene block copolymer, Tg −7° C., styrene content 40 wt %, vinyl fraction 55 mol %, Mw 10 300 g/mol | 41.8 wt % |
| Polybutadiene cis-1,4- (solid) | 5.4 wt % |
| Polybutadiene with active carboxyl groups (MW = 2100 g/mol) | 2.9 wt % |
| Aromatically modified aliphatic hydrocarbon resin, Tg = 48° C., softening point 95-101° C. | 8.9 wt % |
| Muscovite mica | 15.8 wt % |
| 2,2-Methylene-bis-(4-methyl-6-tert-butylphenol) | 0.4 wt % |
| Carbon black | 1.8 wt % |
| Silica | 1.0 wt % |
| Calcium oxide | 3.1 wt % |
| Azodicarbonamide | 1.0 wt % |
| Oxy-bis-sulfo-hydrazide (4,4'-oxybis(benzene sulfonic hydrazide)) | 0.9 wt % |
| Benzene sulfonic acid, zinc salt | 0.1 wt % |
| Benzoquinone dioxime | 2.2 wt % |
| ZBEC | 3.0 wt % |
| Sulphur | 2.1 wt % |
| MBTS | 0.7 wt % |
| Tg Product | 12° C. |
| tan delta @ 20° C. | 1.37 |
| max. tan delta | 1.42 |
| Shore A | 15 |
| Expansion (30 min @ 180° C.) | 128% |

1.2.12 Example 12

| | |
|---|---|
| Rape seed oil | 8.9 wt % |
| Polystyrene-polybutadiene block copolymer, Tg −7° C., styrene content 40 wt %, vinyl fraction 55 mol %, Mw 10 300 g/mol | 21.8 wt % |
| Polybutadiene cis-1,4- (solid) | 5.4 wt % |
| Polybutadiene with active carboxyl groups (MW = 2100 g/mol) | 2.9 wt % |
| Aromatically modified aliphatic hydrocarbon resin, Tg = 48° C., softening point 95-101° C. | 8.9 wt % |
| Muscovite mica | 35.8 wt % |
| 2,2-Methylene-bis-(4-methyl-6-tert-butylphenol) | 0.4 wt % |
| Carbon black | 1.8 wt % |
| Silica | 1.0 wt % |
| Calcium oxide | 3.1 wt % |
| Azodicarbonamide | 1.0 wt % |
| Oxy-bis-sulfo-hydrazide (4,4'-oxybis(benzene sulfonic hydrazide)) | 0.9 wt % |
| Benzene sulfonic acid, zinc salt | 0.1 wt % |
| Benzoquinone dioxime | 2.2 wt % |
| ZBEC | 3.0 wt % |
| Sulphur | 2.1 wt % |
| MBTS | 0.7 wt % |
| Tg Product | 19° C. |
| tan delta @ 20° C. | 1.38 |
| max. tan delta | 1.43 |
| Shore A | 11 |
| Expansion (30 min @ 180° C.) | 168% |

1.2.13 Example 13

| | |
|---|---|
| Rape seed oil | 14 wt % |
| Polystyrene-polybutadiene block copolymer, Tg −7° C., styrene content 40 wt %, vinyl fraction 55 mol %, Mw 10 300 g/mol | 21.8 wt % |
| Polybutadiene cis-1,4- (solid) | 5.4 wt % |
| Polybutadiene with active carboxyl groups (MW = 2100 g/mol) | 2.9 wt % |
| Aromatically modified aliphatic hydrocarbon resin, Tg = 48° C., softening point 95-101° C. | 14.0 wt % |
| Muscovite mica | 25.6 wt % |
| 2,2-Methylene-bis-(4-methyl-6-tert-butylphenol) | 0.4 wt % |
| Carbon black | 1.8 wt % |
| Silica | 1.0 wt % |
| Calcium oxide | 3.1 wt % |
| Azodicarbonamide | 1.0 wt % |
| Oxy-bis-sulfo-hydrazide (4,4'-oxybis(benzene sulfonic hydrazide)) | 0.9 wt % |
| Benzene sulfonic acid, zinc salt | 0.1 wt % |
| Benzoquinone dioxime | 2.2 wt % |
| ZBEC | 3.0 wt % |
| Sulphur | 2.1 wt % |
| MBTS | 0.7 wt % |
| Tg Product | 9° C. |
| tan delta @ 20° C. | 1.40 |
| max. tan delta | 1.42 |
| Shore A | 17 |
| Expansion (30 min @ 180° C.) | 135% |

1.2.14 Example 14

| | |
|---|---|
| Rape seed oil | 14 wt % |
| Polystyrene-polybutadiene block copolymer, Tg −7° C., styrene content 40 wt %, vinyl fraction 55 %, Mw 10 300 g/mol | 21.8 wt % |
| Polybutadiene cis-1,4- (solid) | 5.4 wt % |
| Polybutadiene with active carboxyl groups (MW = 2100 g/mol) | 2.9 wt % |
| Aromatically modified aliphatic hydrocarbon resin, softening point 89° C. | 14.0 wt % |
| Muscovite mica | 25.6 wt % |
| 2,2-Methylene-bis-(4-methyl-6-tert-butylphenol) | 0.4 wt % |
| Carbon black | 1.8 wt % |
| Silica | 1.0 wt % |
| Calcium oxide | 3.1 wt % |
| Azodicarbonamide | 1.0 wt % |
| Oxy-bis-sulfo-hydrazide (4,4'-oxybis(benzene sulfonic hydrazide)) | 0.9 wt % |
| Benzene sulfonic acid, zinc salt | 0.1 wt % |
| Benzoquinone dioxime | 2.2 wt % |
| ZBEC | 3.0 wt % |
| Sulphur | 2.1 wt % |
| MBTS | 0.7 wt % |

1.2.15 Example 15

| | |
|---|---|
| Rape seed oil | 15.0 wt % |
| Statistical polystyrene-polybutadiene copolymer, Tg −7° C., styrene content 40 wt %, vinyl fraction 55 mol %, Mw 15 000 g/mol | 9.0 wt % |
| Polybutadiene cis-1,4- (solid) | 5.4 wt % |
| Polybutadiene with active carboxyl groups (MW = 2100 g/mol) | 6.0 wt % |
| Hydrogenated castor oil | 1.0 wt % |
| Aliphatically modified aromatic hydrocarbon resin, softening point 95-105° C. Novares ™ TK 100 | 18.5 wt % |
| Muscovite mica GHL 20 mesh | 15.3 wt % |
| Graphite | 11.5 wt% |
| 2,2-Methylene-bis-(4-methyl-6-tert-butylphenol) | 0.4 wt % |
| Carbon black | 1.8 wt % |
| Silica | 3.0 wt % |
| Calcium oxide | 3.1 wt % |
| Azodicarbonamide | 1.0 wt % |
| 4,4'-Oxybis(benzene sulfonic hydrazide) | 0.9 wt % |
| Benzene sulfonic acid, zinc salt | 0.1 wt % |
| Benzoquinone dioxime | 2.2 wt % |
| ZBEC | 3.0 wt % |
| Sulphur | 2.1 wt % |
| MBTS | 0.7 wt % |
| Tg Product | 12° C. |
| tan delta @ 20° C. | 1.07 |
| max. tan delta | 1.13 |
| Shore A | 11 |
| Expansion (30 min @ 180° C.) | 145% |

1.2.16 Example 16

| | |
|---|---|
| Rape seed oil | 15.0 wt % |
| Statistical polystyrene-polybutadiene copolymer, Tg −7° C., styrene content 40 wt %, vinyl fraction 55 mol %, Mw 15 000 g/mol | 9.0 wt % |
| Polybutadiene cis-1,4- (solid) | 5.4 wt % |
| Polybutadiene with active carboxyl groups (MW = 2100 g/mol) | 6.5 wt % |
| Polybutadiene with active carboxyl groups (MW = 1300 g/mol) | 0.5 wt % |
| Hydrogenated castor oil | 1.0 wt % |
| Aliphatically modified aromatic hydrocarbon resin, softening point 95-105° C. Novares TK 100 | 20.0 wt % |
| Muscovite mica GHL 20 mesh | 15.3 wt % |
| Graphite | 7.77 wt % |
| 2,2-Methylene-bis-(4-methyl-6-tert-butylphenol) | 0.40 wt % |
| Carbon black | 1.80 wt % |
| Silica | 4.0 wt % |
| Calcium oxide | 3.1 wt % |
| Azodicarbonamide | 0.98 wt % |
| 4,4'-Oxybis(benzene sulfonic hydrazide) | 1.15 wt % |
| Benzene sulfonic acid, zinc salt | 0.1 wt % |
| Benzoquinone dioxime | 2.2 wt % |
| ZBEC | 3.0 wt % |
| Sulphur | 2.1 wt % |
| MBTS | 0.7 wt % |
| Tg Product | 15° C. |
| tan delta @ 20° C. | 1.24 |
| max. tan delta | 1.31 |
| Shore A | 12 |
| Expansion (30 min @ 180° C.) | 150% |

1.2.17 Examples 17 to 31

In addition, formulations with advantageous properties were obtained when formulations analogous to the compositions 1 to 14 were prepared, wherein the respective content of the respectively added block copolymers a) was replaced by a corresponding amount of a statistical polystyrene-polybutadiene copolymer (Tg −7° C., styrene content 40 wt %, vinyl content 55%, Mw 15 000 g/mol).

1.3 FIGURES

Figure 2:
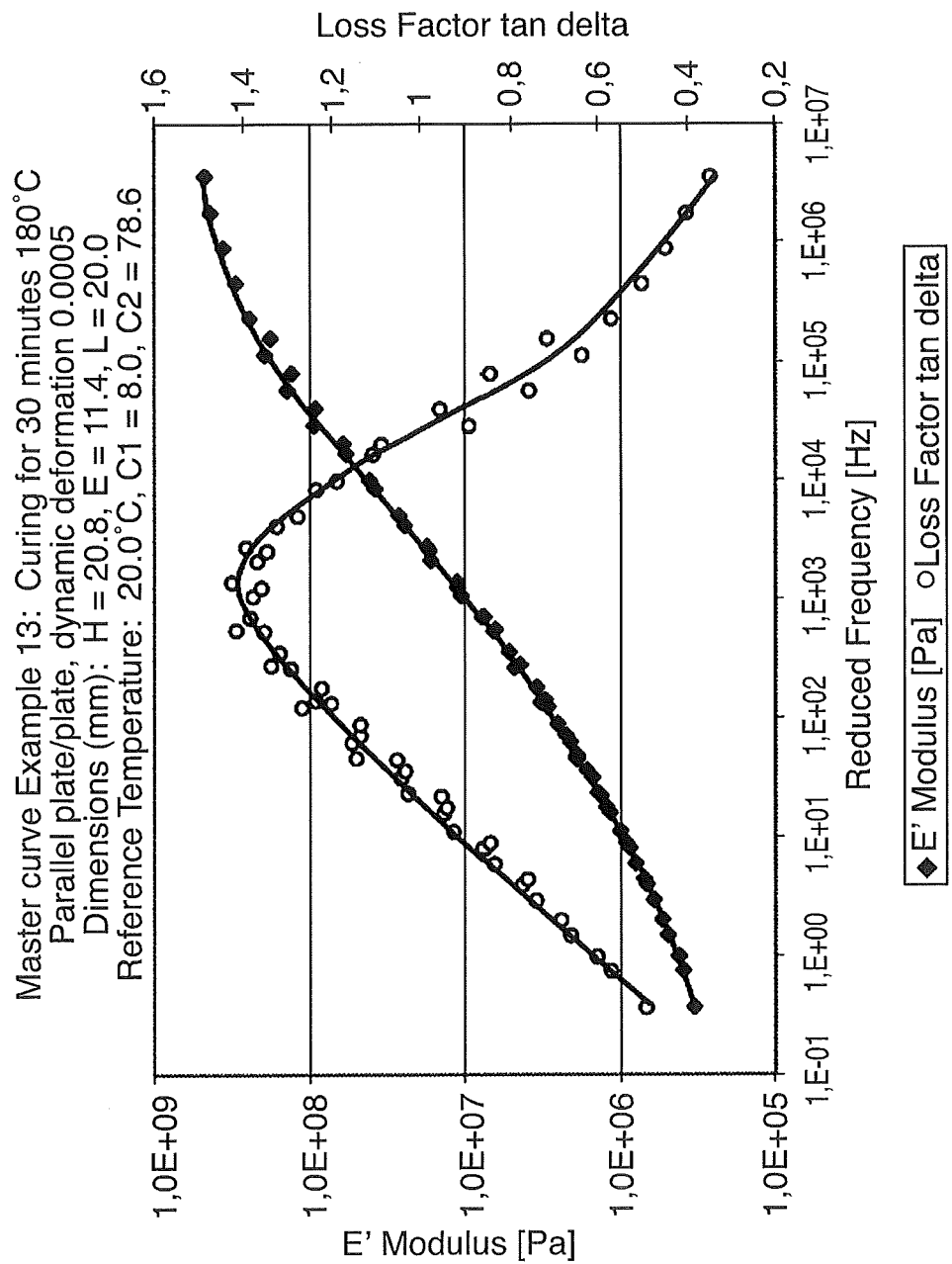
Figure 3:
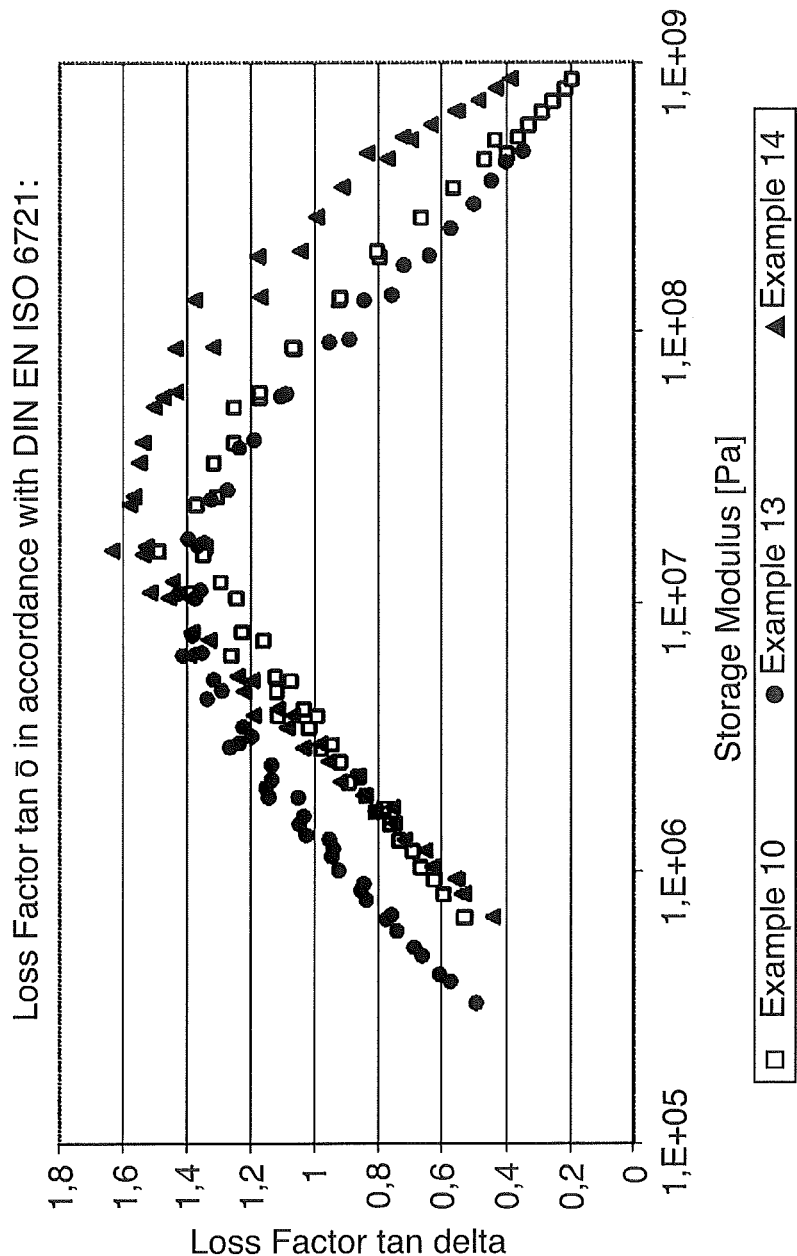
Figure 4:
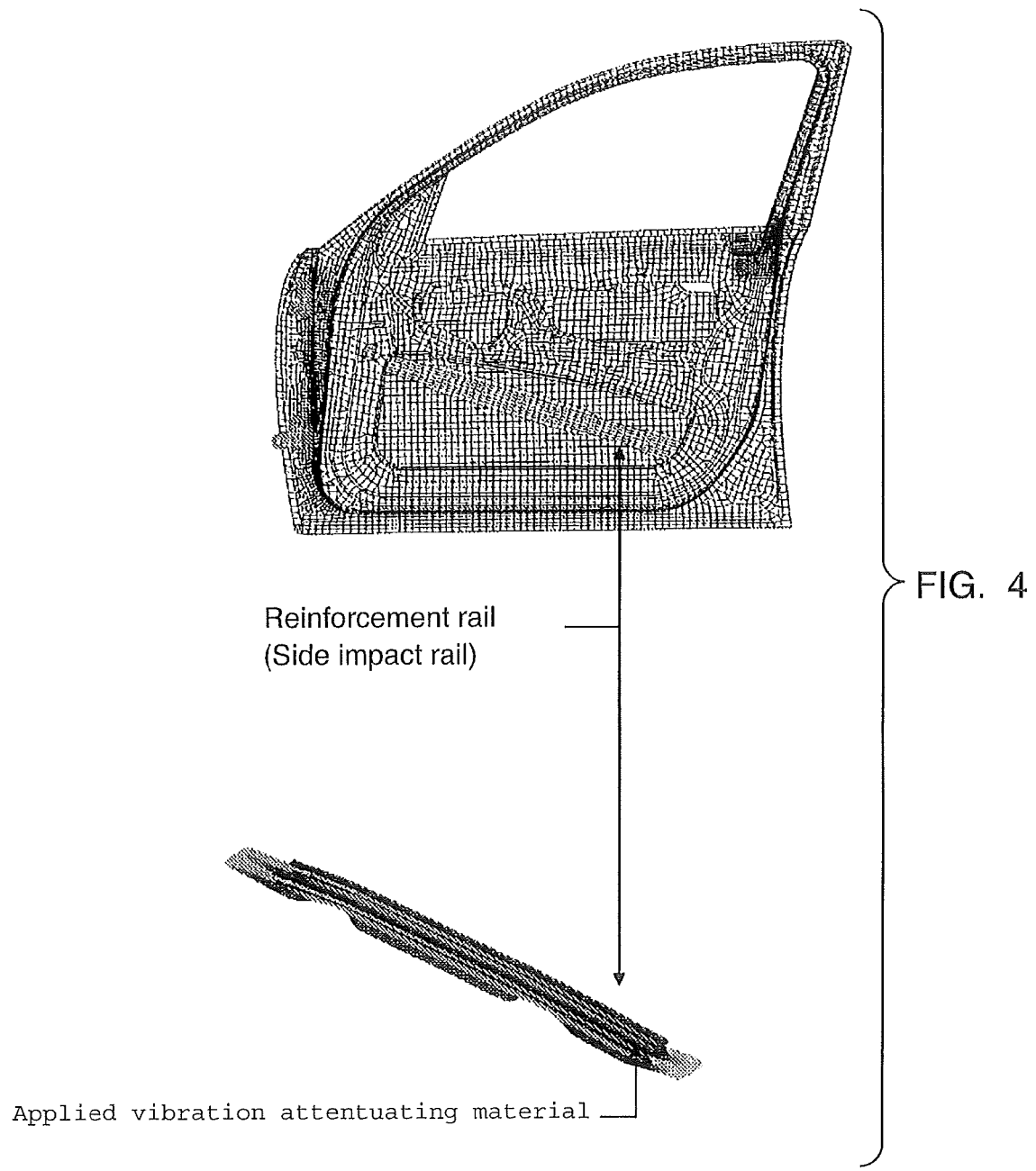

FIG. 1:
Master curve for Example 10:
FIG. 2
Master curve for Example 13:
FIG. 3
Loss factor tan delta in accordance with DIN EN ISO 6721:
FIG. 4
Example of use of the composition according to the invention.

Top: schematic drawing of an automobile door with strengthening bars (lateral impact absorbers) for lateral impact prevention.

Bottom: insulated strengthening bar with the vibration attenuating composition applied in two strips

The invention claimed is:

1. A thermally curable composition, comprising, based on the total composition
   a) 5 to 90 wt % of an olefinic double bond-containing copolymer based on diene and on an aromatic substituted olefin, wherein the copolymer is liquid or pasty at 22° C. and has a glass transition temperature, measured by a DSC method, between −30° C. and +15° C., and wherein the copolymer comprises a diene fraction and the diene fraction has a vinyl fraction of at least 20 mol %,
   b) a vulcanization system selected from the group consisting of:
      b1) sulfur and one or more accelerator(s),
      b2) peroxidic or disulfidic vulcanization systems
      b3) quinones, quinone dioximes or dinitrosobenzene, and
   c) a blowing agent.

2. The composition according to claim 1, wherein a copolymer of styrene and a diene represents the copolymer a).

3. A thermally curable composition that is a pumpable composition at a temperature in the range of 15 to 60° C. comprising, based on the total composition
   a) 5 to 90 wt % of an olefinic double bond-containing copolymer based on diene and on an aromatic substituted olefin that is liquid or pasty at 22° C. and that comprises a diene fraction, the diene fraction having a vinyl fraction of at least 20 mol %,
   b) a vulcanization system selected from the group consisting of:
      b1) sulfur and one or more accelerator(s),
      b2) peroxidic vulcanization systems
      b3) quinones, quinone dioximes or dinitrosobenzene, and
   c) a blowing agent,
wherein after the thermal curing, the composition has a loss factor tan δ, measured by a DMA method, of at least 0.50 in the temperature range of −5° C. to +40° C.

4. The composition according to claim 1, wherein the copolymer a) has a styrene content, based on the total copolymer, of at least 10 wt %.

5. The composition according to claim 1, wherein the copolymer a) has a number average molecular mass of at least 1000 and at most 50 000.

6. The composition according to claim 1, wherein the vinyl fraction in the diene fraction is at least 40 mol % and at most 80 mol %.

7. The composition according to claim 1, comprising, based on the total composition,
0.5 to 6.5 wt % sulfur,
0.25 to 20 wt % vulcanization accelerator
as the vulcanization system b).

8. The composition according to claim 1, additionally comprising, based on the total composition,
d) 10 to 45 wt. % filler.

9. The composition according to claim 1, comprising, based on the total composition, up to 6 wt % blowing agent.

10. The composition according to claim 1, additionally comprising, based on the total composition 1-12 wt % solid rubber and/or thermoplastic polymer and 1-25 wt % polydiene with a number average molecular mass in the range of 1000 to 10,000, which possesses carboxylic groups.

11. The composition according to claim 1, additionally comprising, based on the total composition, 2-40 wt % hydrocarbon resin.

12. The composition according to claim 1, additionally comprising, based on the total composition, 2-40 wt % plasticizer.

13. The composition according to claim 1, wherein at a temperature in the range of 15 to 60° C. the composition exhibits a viscosity such that the composition can be pumped with a pump.

14. The composition according to claim 1, wherein after curing, the loss factor tan δ measured by a DMA method is at least 0.50 in the temperature range of −5° C. to +40° C.

15. The composition according to claim 1, wherein the blowing agent is a chemical blowing agent which is capable of releasing gases by decomposition when heated to an activation temperature.

16. The composition according to claim 1, wherein the blowing agent is present in an amount effective to achieve an expansion degree of 100 to 300% upon heating to an activation temperature.

17. The composition according to claim 1, wherein the copolymer is a block copolymer.

18. A thermally curable composition, comprising, based on the total composition:
a) 5 to 90 wt % of an olefinic double bond-containing copolymer based on diene and on an aromatic substituted olefin, wherein the copolymer is liquid or pasty at 22° C. and has a glass transition temperature, measured by a DSC method, between −30° C. and +15° C., and wherein the copolymer comprises a diene fraction and the diene fraction has a vinyl fraction of at least 20 mol %,
b) a vulcanization system selected from the group consisting of:
b1) sulfur and one or more accelerator(s),
b2) peroxidic or disulfidic vulcanization systems
b3) quinones, quinone dioximes or dinitrosobenzene, and
c) up to 12 wt % solid rubber and/or thermoplastic polymer.

19. The composition according to claim 18, comprising up to 5 wt % solid rubber and/or thermoplastic polymer.

20. The composition according to claim 18, wherein the vinyl fraction in the diene fraction is at least 40 mol % and at most 80 mol %.

* * * * *